(12) United States Patent
Friesen et al.

(10) Patent No.: US 10,624,277 B2
(45) Date of Patent: Apr. 21, 2020

(54) COMPOUND INTERCROPPING PROCESS

(71) Applicants: Kenneth Kyle Friesen, Leamington (CA); John Friesen, Leamington (CA); Adam Suder, Leamington (CA)

(72) Inventors: Kenneth Kyle Friesen, Leamington (CA); John Friesen, Leamington (CA); Adam Suder, Leamington (CA)

(*) Notice: Subject to any disclaimer, the term of this patent is extended or adjusted under 35 U.S.C. 154(b) by 743 days.

(21) Appl. No.: 15/178,653

(22) Filed: Jun. 10, 2016

(65) Prior Publication Data

US 2016/0295806 A1 Oct. 13, 2016

(51) Int. Cl.
*A01G 22/00* (2018.01)

(52) U.S. Cl.
CPC .................. *A01G 22/00* (2018.02)

(58) Field of Classification Search
CPC ...................................................... A01G 22/00
See application file for complete search history.

(56) References Cited

U.S. PATENT DOCUMENTS

| | | | | |
|---|---|---|---|---|
| 3,546,861 A | * | 12/1970 | Clendenin | A01D 43/08 56/13.4 |
| 4,503,660 A | * | 3/1985 | Kelderman | A01D 43/12 56/11.2 |
| 6,284,711 B1 | * | 9/2001 | Evans | A01N 47/34 504/244 |
| 2006/0196116 A1 | * | 9/2006 | Zettl | G06Q 10/00 705/301 |
| 2008/0305952 A1 | * | 12/2008 | Arnevik | A01N 25/00 504/127 |

OTHER PUBLICATIONS https://www.hooksgreenhouse.com/2019/06/13/the-basics-of-crop-rotation/.*
https://www.thedailygarden.us/garden-word-of-the-day/determinate-vs-indeterminate.*
https://www.thedailygarden.us/garden-word-of-the-day/annuals.*
https://www.thedailygarden.us/garden-word-of-the-day/perennials.*

* cited by examiner

*Primary Examiner* — Christopher J. Novosad
(74) *Attorney, Agent, or Firm* — Carlson, Gaskey & Olds, P.C.

(57) ABSTRACT

A method for intercropping includes planting a first determinate crop and a first indeterminate crop adjacent one another. A second indeterminate crop is planted in place of the first determinate crop after the first indeterminate crop has reached a desired maturity.

10 Claims, 3 Drawing Sheets

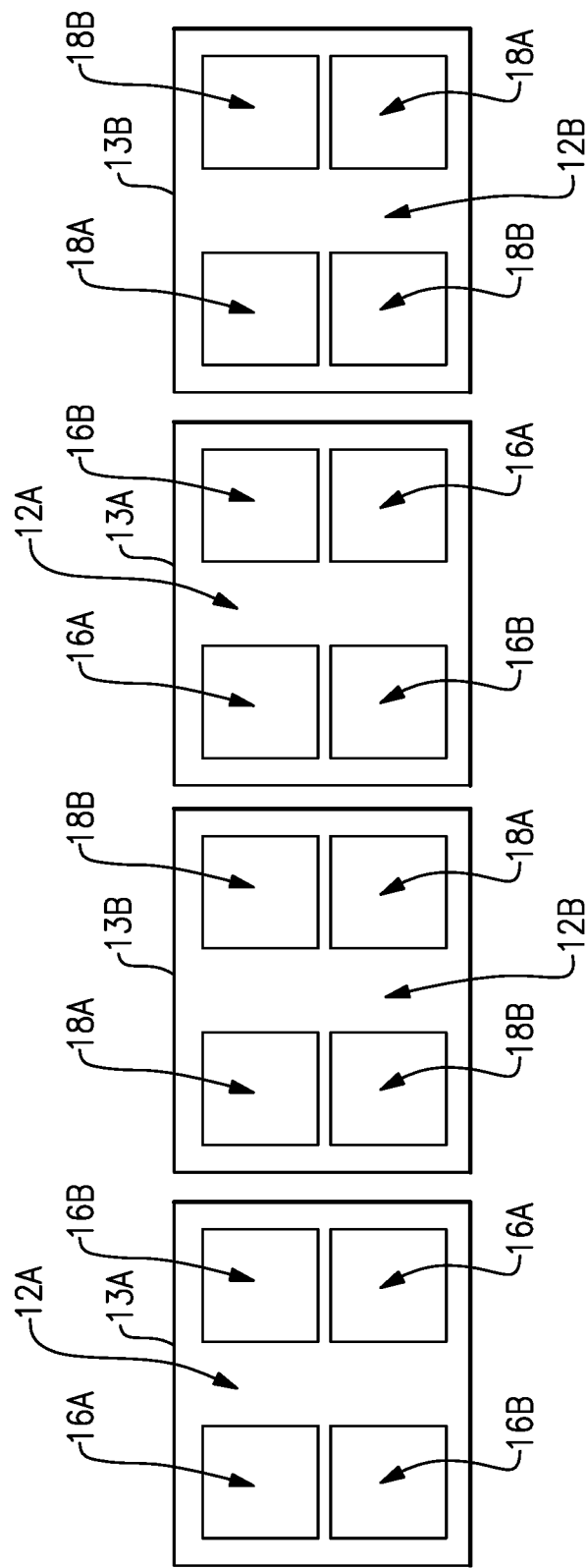

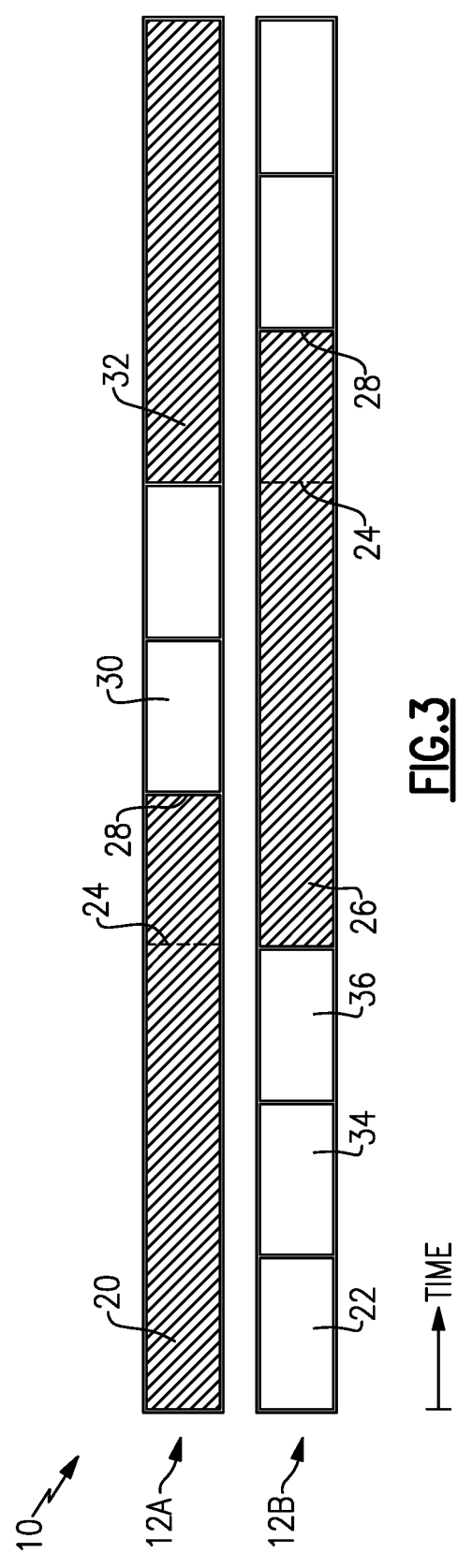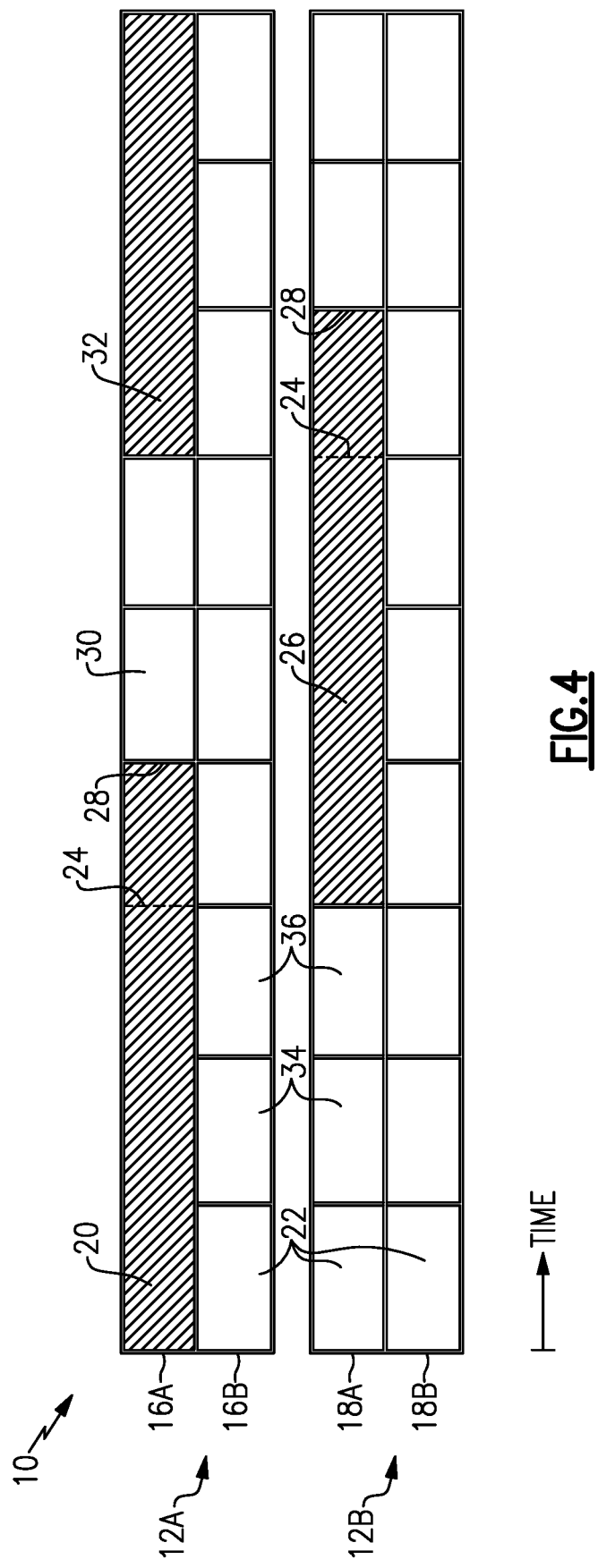

COMPOUND INTERCROPPING PROCESS

CROSS REFERENCE TO RELATED APPLICATIONS

This application claims priority to U.S. Provisional Application No. 62/145,562, which was filed on Apr. 10, 2015.

BACKGROUND

This disclosure relates to intercropping plants. Intercropping is a form of cropping in which two or more crops of differing species occupy the same space simultaneously. Relay intercropping is a form of cropping in which two or more crops grow simultaneously during part of the life cycle of each crop. In relay intercropping, a second crop is planted before the first crop matures in order to reduce down time between crop cycles.

Crops are either determinate or indeterminate plants. A determinate plant grows to a predetermined size for the particular species. An indeterminate plant can grow to an undetermined size and shape until killed or annihilated by some external factor, such as a frost. Known intercropping methods use only determinate or only indeterminate plants.

SUMMARY

A method for intercropping includes planting a first determinate crop and a first indeterminate crop adjacent one another. A second indeterminate crop is planted in place of the first determinate crop after the first indeterminate crop has reached a desired maturity.

A method for intercropping includes arranging a plurality of first and second grow bags in a row such that the first and second grow bags alternate. A first indeterminate plant is planted in the first grow bags. A first determinate plant is planted in the second grow bags. A second indeterminate plant is planted in the second grow bags after the first indeterminate plant in the first grow bags has reached a desired maturity.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 illustrates another example configuration for intercropping.

FIG. 3 illustrates an example relay intercropping process.

FIG. 4 illustrates another example relay intercropping process.

DETAILED DESCRIPTION

Figure 1:
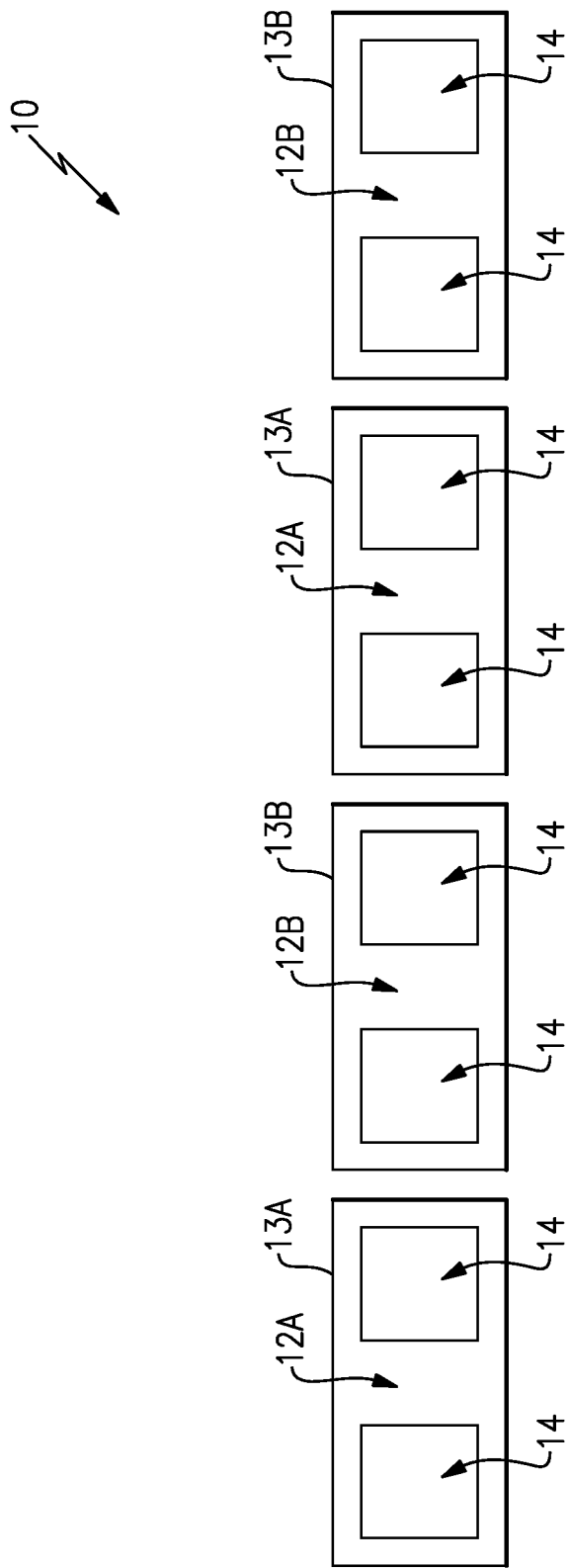
FIG. 1 illustrates an example configuration for intercropping.

FIG. 1 schematically illustrates an exemplary configuration for intercropping. A greenhouse system 10 includes first and second grow cycles 12A and 12B. In an embodiment, first and second grow bags 13A, 13B are used to plant plants for each grow cycle 12A, 12B, respectively. In some embodiments, the grow cycles 12A, 12B may be planted in a trough of soil or in the ground with or without the use of grow bags. In other embodiments, the grow cycles 12A, 12B may be planted in pots or other plant growing containers.

In the illustrated example, first and second grow bags 13A, 13B are arranged in an alternating manner, such that plants in the first and second grow bags 13A, 13B can be intercropped. In an embodiment, grow cubes 14 are used to plant indeterminate and determinate crops in the grow bags 13A, 13B. Grow cubes 14 are cubes of an inert material that hold moisture and oxygen to help root systems grow. Although grow cubes 14 are shown, other growing media are contemplated within the scope of this disclosure. For example, when the grow cycles 12A, 12B are planted in a trough of soil, pot, other plant growing container, or in the ground, grow cubes may or may not be needed. In an embodiment, an indeterminate crop is planted in the first grow bags 13A and a determinate crop is planted in the second grow bags 13B. In one embodiment, the grow bags 13A, 13B are in a hydroponic system. In another embodiment, the grow bags 13A, 13B are in an aquaponics system. In yet another embodiment, the grow cycles 12A, 12B are in an organic system. In some embodiments, each of the grow cycles 12A, 12B will have a separate irrigation line. In other embodiments, each of the grow cycles 12A, 12B will have a plurality of irrigation lines. A plurality of grow bags 13A, 13B may continue in an alternating pattern down a row of a desired length. Grow bags 13A, 13B may also be arranged in a plurality of rows. The grow bags 13A, 13B may be of different sizes and/or styles. Although two grow cubes 14 are illustrated in each grow bag 13A, 13B, more or fewer grow cubes 14 may be used in each grow bag 13A, 13B. Although grow bags are discussed, other types of hydroponic, aquaponics and organic systems may fall within the scope of this disclosure.

FIG. 2 schematically illustrates a second exemplary configuration for intercropping. First and second grow cycles 12A, 12B include first and second grow bags 13A and 13B arranged in an alternating manner. In the illustrated example, two different types of grow cubes are planted in each of the grow bags 13A and 13B. For example, in grow bags 13A, grow cubes 16A are initially planted with an indeterminate plant, while grow cubes 16B are initially planted with a determinate plant in an intercropped fashion. In an example, grow cubes 18A and 18B are both initially a determinate plant. The plants in the grow bags 13A and 13B may be of the same species or different species.

FIG. 3 schematically illustrates a relay intercropping process over time. The first grow cycle 12A is initially planted with a first indeterminate crop 20. The second grow cycle 12B is initially planted with a first determinate crop 22. Once a crop cycle of the first indeterminate crop 20 in the first grow cycle 12A has reached a desired maturity (shown schematically at reference numeral 24), a second indeterminate crop 26 is planted in the second grow cycle 12B. In an embodiment, the desired maturity 24 is selected such that the second indeterminate crop 26 begins producing yields by the time the first indeterminate crop 20 is annihilated (shown schematically at reference numeral 28). After the first indeterminate crop 20 is annihilated, it is removed from the system 10 and replaced with a second determinate crop 30. When the second indeterminate crop 26 reaches a desired maturity 24, a third indeterminate crop 32 is planted in the first grow cycle 12A. This cycle of alternating indeterminate crops in the first and second grow cycles 12A, 12B may be repeated as many times as desired, or as long as the grow bags 13A, 13B can sustain proper support of the growing process.

In some instances, the life cycle of an indeterminate crop can be drawn out longer than a determinate crop. The determinate crops 22, 30 may be selected such that they have a shorter life cycle than the indeterminate crops 20, 26, 32. When the determinate crops have a short life cycle, multiple determinate crops can be planted and harvested before it is time to plant another indeterminate crop in the grow cycle. In the illustrated example, additional determinate crops 34, 36 are planted consecutively in grow cycle 12B before the second indeterminate crop 26 is planted. The determinate crops, 22, 34, 36 may be of the same species or different species. In this example, three determinate crops 22, 34, 36 are planted consecutively. However, in other embodiments more or fewer determinate crops may be planted before the first indeterminate crop 20 reaches the desired maturity 24, depending on the cycle of the particular crops chosen. Although two grow cycles 12A, 12B are illustrated, the disclosed process may be used with a different number of grow cycles.

FIG. 4 schematically illustrates another embodiment of the relay intercropping process over time. The first grow cycle 12A is planted with grow cubes 16A and 16B, which initially have a first indeterminate plant 20 and a first determinate plant 22, respectively. The second grow cycle 12B is initially planted with determinate plants 22 in grow cubes 18A and 18B. When the first indeterminate plant 20 has reached a desired maturity 24, a second indeterminate crop 26 is planted at grow cube 18A. Once the second indeterminate crop 26 has reached a desired maturity 24, a third indeterminate crop 32 is planted at grow cube 16A. This cycle of alternating indeterminate crops in first and second grow cycles 12A, 12B may be repeated as many times as desired.

In some embodiments, additional determinate crops 34, 36 are planted consecutively in grow cubes 16B, 18A and 18B before the first indeterminate crop 20 has reached the desired maturity 24. After the first indeterminate crop 20 has been annihilated 28, it is removed from the grow cube 16A and an additional determinate crop 30 may be planted in its place. Grow cubes 16B and 18B may continue to grow determinate crops, such that the indeterminate crops 20, 26, 32 are always intercropped with a determinate crop in the same grow bag. The determinate crops 22, 30, 34, 36 may be the same species or different species. The determinate crops 22, 30, 34, 36 may all have crop cycles of the same length or of differing lengths.

The above examples of compound intercropping of indeterminate and determinate plants allow for increased production and efficiency of a greenhouse system. The disclosed process of compound intercropping allows for multiple separate harvests at a time from a hydroponic, aquaponics or organic greenhouse system, as well as reduced time in between harvests. This process is not limited to a specific species, and may be of uniform speciation or multiple speciation.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for intercropping, comprising:
    planting a first determinate crop and a first indeterminate crop adjacent one another in a greenhouse; and
    planting a second indeterminate crop in place of the first determinate crop adjacent the first indeterminate crop after the first indeterminate crop has reached a desired maturity.

2. The method as recited in claim 1, wherein the crops are selected such that the first determinate crop has a determinate crop cycle that is completed before the first indeterminate crop has reached the desired maturity.

3. The method as recited in claim 2, wherein a second determinate crop is planted in place of the first determinate crop before the first indeterminate crop has reached the desired maturity.

4. The method as recited in claim 1, comprising planting another determinate crop in place of the first indeterminate crop after the first indeterminate crop has stopped producing.

5. The method as recited in claim 1, wherein a plurality of determinate and indeterminate crops are planted in a row, such that the determinate and indeterminate crops alternate.

6. The method as recited in claim 1, wherein the crops are planted in a hydroponic or aquaponics growing system.

7. The method as recited in claim 1, wherein the crops are planted in an organic growing system.

8. The method as recited in claim 1, wherein the first indeterminate crop and the second indeterminate crop are different species.

9. The method as recited in claim 1, wherein the first indeterminate crop and the second indeterminate crop are the same species.

10. The method as recited in claim 1, wherein the desired maturity is selected such that the second indeterminate crop will mature before the first indeterminate crop is annihilated.

\* \* \* \* \*